United States Patent Office 3,157,692
Patented Nov. 17, 1964

---

3,157,692
PREPARATION OF ALKALI METAL ENOLATES OF 2,2,4,4-TETRAALKYLACETOACETIC ESTERS
Raymond D. Clark and Ronald G. Nations, Kingsport, Tenn., assignors to Eastman Kodak Company, Rochester, N.Y., a corporation of New Jersey
No Drawing. Filed Sept. 20, 1961, Ser. No. 139,365
5 Claims. (Cl. 260—483)

This invention relates to the preparation of reactive alkali-metal enolates of 2,2,4,4-tetraalkylacetoacetic esters. More particularly, it relates to the preparation of each enolates by the cleavage of tetraalkyl-1,3-cyclobutanediones.

The metal enolates of 2,2,4,4-tetraalkylacetoacetic esters are valuable chemical intermediates. The literature provides evidence of the reactivity and utility of enolates in general. See, for example, Hauser et al., "Organic Reactions," vol. I, John Wiley & Sons, Inc., New York, 1942, pages 266–302; Hauser et al., "Organic Reactions," vol. VIII, John Wiley & Sons, Inc., New York, 1954, pages 57–196; and Cope et al., "Organic Reactions," vol. IX, John Wiley & Sons, Inc., New York, 1957, pages 107–331. The literature shows that metal enolates undergo a variety of reactions. For example, they may be acylated, alkylated or coupled. Esters and acyl halides are examples of acylating agents. Related to acylation is the reaction with nitriles to yield a similar product after hydrolysis. Enolates may be alkylated with a wide variety of compounds but three general categories serve to illustrate the reaction: alkylation with (1) alkyl halides, (2) alkyl esters of inorganic acids and (3) epoxides. Enolates also undergo coupling reactions with halogens.

The usual method of preparing enolates of the type prepared by our process requires a number of steps. In the known method, sodium triphenylmethide is prepared from sodium amalgam and triphenylchloromethane. The sodium triphenylmethide then is used in the preparation of the 2,2,4,4-tetraalkylacetoacetic ester by the Claisen condensation or by the reaction of isobutyryl chloride with the sodium enolate of ethyl isobutyrate. Finally, the sodium enolate of the 2,2,4,4-tetraalkylacetoacetic ester is generated in situ by adding sodium triphenylmethide to the substituted acetoacetic ester thus prepared. This procedure is tedious, the product is contaminated with triphenylmethane and the yields are low. The process of the present invention is an improvement in at least three respects, namely: (1) the process is simpler, (2) the starting materials are available in quantity, and (3) the product is not contaminated by triphenylmethane.

The process of the invention, in general, comprises forming a reaction mixture comprising a tetraalkyl-1,3-cyclobutanedione and an equimolar amount of an alkali-metal alkoxide, in the absence of labile hydrogen atoms, maintaining the reaction mixture at a reaction temperature below 150° C. and recovering the alkali-metal enolate as a reaction product. Thus, characterizing elements of the process are: (1) a stoichiometric amount of the alkali-metal alkoxide is employed, (2) the reaction is carried out in the absence of labile hydrogen atoms and (3) the reaction is carried out at a moderate temperature, i.e., below 150° C.

Although we do not wish to be bound by theoretical explanations of the mechanism of the reaction occurring in our process, a possible mechanism is as follows:

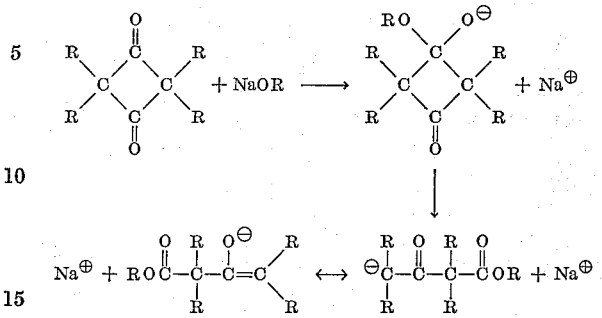

An important element of our process is that the alkali-metal alkoxide and the dione are reacted in substantially stoichiometric ratios. In forming the reaction mixture at least an equimolar amount of the alkoxide should be present. If excess alkoxide is present, the dione is converted to the enolate by reaction with an equimolar amount of alkoxide and the excess alkoxide remains unchanged but, if the ratio of the alkoxide to the dione is less than 1 mole per mole, the excess of dione is lost in undesirable side reactions and the yield of enolate is decreased accordingly.

If the reaction mixture is heated rapidly, a very vigorous reaction occurs. Therefore, heating is usually moderate so that the temperature rises slowly. We have found that superior yields of enolate are obtained with a reaction temperature in the range of 30 to 90° C. The enolate can be obtained in lower yields at somewhat higher and lower temperatures. However, the reaction is impractically slow at temperatures below 0° C. At temperatures above 150° C., the enolate decomposes rapidly and yield of enolate is drastically reduced. Accordingly, the process of the invention is carried out at a temperature in the range of 0° to 150° C. and preferably 30° to 90° C.

The process of the invention can be carried out in a simple manner by heating a mixture of a tetraalkyl-1,3-cyclobutanedione and an alkali-metal alkoxide in the presence of an inert solvent. The solvent is not essential but is used to moderate the reaction and avoid overheating. Examples of suitable inert solvents include hydrocarbons such as benzene, toluene or hexane; cyclic or acyclic ethers such as diethyl ether or tetrahydrofuran; and cyclic or acyclic tertiary amines such as triethylamine or pyridine.

As already stated, the process of the invention is carried out in the absence of labile hydrogen atoms. We avoid the use of solvents such as alcohols, water, amines, acids, etc., which have a hydrogen atom that is easily removable as a proton. By carrying out the reaction in the absence of labile hydrogen atoms, we obtain as product a reactive metal enolate which is valuable as an intermediate and avoid producing an unreactive acetoacetic ester.

The 2,2,4,4-tetraalkyl-1,3-cyclobutanediones employed as reactants in our process are compounds of the formula:

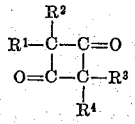

wherein $R^1$, $R^2$, $R^3$ and $R^4$ are the same or different alkyl radicals of from 1 to 4 carbon atoms. The pair of substituents $R_1$ and $R_2$ and/or the pair of substituents $R_3$ and $R_4$ can also be alkylene groups, which with the carbon atom to which they are attached, form a 5 or 6 membered saturated carbocyclic ring. For convenience, we use the term tetraalkylcyclobutanediones to designate all of such tetra-substiuted cyclobutanediones.

The tetraalkyl-1,3-cyclobutanediones are readily prepared by dimerization of disubstituted ketenes, such as dimethylketene, diethylketene, ethylmethylketene, butylethylketene, diisobutylketene, tetramethyleneketene, pentamethyleneketene, etc. ("Organic Reactions," R. Adams, editor, John Wiley and Sons, New York, 1946, vol. 3, Chap. 3, "Preparation of Ketenes and Ketene Dimers.") The disubstituted ketenes are available in quantity by a method described in the copending application of R. H. Hasek and E. U. Elam, Ser. No. 841,961, filed September 24, 1959.

The alkali-metal alkoxide used in our process can, in general, be any alkali-metal alkoxide prepared from an aliphatic, straight or branched chain alcohol having from 1 to about 12 carbon atoms per molecule. Best results are obtained with the alkoxides prepared from methanol and ethanol and for economic reasons the preferred alkali metal is sodium.

The following example describes the preparation and isolation of an alkali-metal enolate of a 2,2,4,4-tetraalkylacetoacetic ester in the form of a dry powder in accordance with the invention.

Example 1

A mixture of 113.0 g. (about 2 moles) of sodium methoxide (90–95% purity) and 1000 ml. of benzene was heated to reflux under an atmosphere of nitrogen. The mixture was stirred while 280.0 g. (2.00 moles) of tetramethyl-1,3-cyclobutanedione was gradually added over a period of 30 min. The mixture then was heated under reflux for an additional 30 min. Heating was stopped and dry nitrogen was blown through the mixture to remove the major portion of the benzene. After 1 hour the nitrogen line was disconnected and the flask was placed in a vacuum oven to complete the drying procedure. The solid was dried at room temperature under house vacuum (100–300 mm.) for 18 hours and at 10–20 mm. for 21 hours. The sodium enolate of methyl 2,2,4-trimethyl-3-oxovalerate was thus obtained as a light yellow powder; yield, 375.8 (95%).

The sodium enolate of methyl 2,2,4-trimethyl-3-oxovalerate as recovered in Example 1 is very reactive. When exposed to the air it undergoes a vigorous exothermic reaction which destroys the enolate. The dry enolate is also destroyed by heating. It therefore must be stored in a cool place under an inert atmosphere.

To demonstrate the identity of the enolate of Example 1, the following reaction, patterned after that of Hauser and Renfrow [C. R. Hauser and W. B. Renfrow, Jr., J. Am. Chem. Soc., 59, 1826 (1937)], was carried out.

Example 2

The dry sodium enolate of methyl 2,2,4-trimethyl-3-oxovalerate (41.5 g., 0.21 mole) was slurried with 250 ml. of dry ethyl ether. The mixture was cooled in an ice bath and 13.0 ml. (13.6 g., 0.227 mole) of glacial acetic acid was added rapidly to it. Cold water then was added, the mixture was shaken, and the layers were separated. The organic layer was dried with anhydrous magnesium sulfate and filtered. The product was distilled through a 3 ft. Nestor spinning band column. Methyl 2,2,4-trimethyl-3-oxovalerate was obtained in 68% yield (24.4 g.), B.P. 71–73° at 8.8–9.2 mm. $n_D^{20}$ 1.4229–1.4232.

The next two examples describe the preparation of alkali-metal enolates of other 2,2,4,4-tetraalkylacetoacetic esters in accordance with the invention.

Example 3

In a manner similar to Example 1, 2,4-diethyl-2,4-dimethyl-1,3-cyclobutanedione was treated with sodium methoxide in 1:1 molar ratio to give the sodium enolate of methyl 2,4-dimethyl-2-ethyl-3-oxohexanoate. The identity of this enolate was demonstrated by the Hauser and Renfrow method of Example 2. Methyl 2,4-dimethyl-2-ethyl-3-oxohexanoate, B.P. 95–98° (10 mm.) was obtained in 80% yield.

Example 4

A mixture of 1 mole of 2,4-dipropyl-2,4-dimethyl-1,3-cyclobutanedione and 1 mole of sodium ethoxide in tetrahydrofuran was slowly heated during 30 min. in tetrahydrofuran solution to 80° C. The solution turned a deep red-orange color while heating was continued at 80° C. for 2 hr. Heating was discontinued and dry nitrogen was bubbled into the solution to dispel the tetrahydrofuran. Last traces of the tetrahydrofuran were removed by drying the product in a vacuum oven during 28 hr. The resulting powdered orange sodium enolate of ethyl 2,4-dimethyl-2-propyl-3-oxoheptanoate was rapidly deactivated on contact with air or moisture. The Hauser-Renfrow test of Example 2 gave ethyl 2,4-dimethyl-2-propyl-3-oxoheptanoate, B.P. 120–124° (6–8 mm.).

As illustrated by the above examples, the process of the invention is uniquely adapted for producing the metal enolate as an isolated compound which is highly reactive and can subsequently be subjected to various reactions such as alkylation, acylation, hydrolysis and coupling to yield many valuable derivatives. However, in many instances the metal enolate can be prepared in accordance with the invention in situ with the reagent for the subsequent reaction. Thus, a reaction mixture can be formed of stoichoimetric proportions of the cyclobutanedione, the alkali-metal alkoxide and the reagent for preparing the derivative of the enolate. The reagent for producing the desired derivative, which reagent, for example, can be an aralkyl halide, can serve as a reaction solvent but must not be extremely reactive with the alkali-metal alkoxide or with the cyclobutanedione because they must not be consumed by such a side reaction before the metal enolate is formed.

The following example illustrates such a reaction in which an alkali-metal enolate is prepared in situ with an aralkylating agent (benzyl chloride) and is thus converted to a desired aralkyl substituted acetoacetic ester. It should be noted that the reaction between the alkoxide and the aralkyl halide is fairly slow so that the alkoxide is not consumed by this side reaction before it can participate in the desired one of forming the alkali-metal enolate.

Example 5

A mixture of 140.2 g. (1.00 mole) of tetramethyl-1,3-cyclobutanedione, 57.0 g. (1.00 mole) of 95% sodium methoxide, 126.6 g. (1.00 mole) of benzyl chloride and 150 ml. of toluene was stirred and heated so that the temperature of the mixture gradually rose to 55°. The temperature subsequently was maintained at 55–57° for 3 hours 10 minutes by heating or cooling as necessary and then was gradually raised so that refluxing began at the end of 1½ hours. Finally, the mixture was heated at reflux for one hour. The reaction mixture stood at room temperature for 20 hours and then was poured into ice water. Organic material was extracted with three portions of benzene and the combined extracts were dried with anhydrous magnesium sulfate. The drying agent was removed by filtration and a portion (50%) of the filtrate was concentrated under vacuum until the pot temperature reached 130° (40 mm. pressure). The residue was dissolved in 2 l. of n-hexane and the resulting solution was cooled in Dry Ice. A solid crystallized; yield, 71.5 g. (55%), M.P. 34–37.5°. The solid was recrystallized to a constant M.P. of 39.5–41.5°. Its analysis is in agreement with its formulation as methyl 5-phenyl-2,2,4,4-tetramethyl-3-oxovalerate.

*Analysis.*—Calcd. for $C_{16}H_{22}O_3$: C, 73.25; H, 8.45; sapon. equiv., 262.3; mol. wt., 262. Found: C, 73.10; H, 8.47; sapon. equiv., 265.3; mol. wt., 262.

The next example illustrates still another preparation in accordance with the invention, wherein a derivative of the enolate is prepared by adding a reagent to the enolate in a subsequent reaction stage after preparation of the enolate.

*Example 6*

Tetramethyl-1,3-cyclobutanedione (70.1 g., 0.5 mole) was mixed with 35.5 g. (about 0.60 mole) of sodium methoxide (technical grade) and 275 ml. of benzene in a three-necked flask equipped with a stirrer, a condenser and a thermometer. Moisture was excluded by means of a calcium chloride drying tube. The mixture was stirred and heated so that its temperature gradually rose to 70° during 35 minutes. The temperature subsequently was maintained at 70–75° for 30 minutes, by heating or cooling as necessary, and then was raised to 80° during 15 minutes. The mixture was heated under reflux for 30 minutes and then was cooled to 25° during 1½ hours. p-Xylylene dichloride (35.01 g., 0.20 mole) was added rapidly to the enolate thus prepared and the mixture was stirred without heating for 30 minutes. The mixture then was heated to reflux during 30 minutes and maintained at reflux for 30 minutes subsequently. After the period of reflux the mixture was cooled to 8° and poured into ice water. The product was extracted with 900 ml. of benzene in three portions. The extract was dried with anhydrous sodium sulfate and the drying agent then was removed by filtration. The solvent was distilled and the product, a yellow solid, was dried at 85–90° and 2 mm. for two hours; yield of solid: 87.40 g. (98%), M.P. 102–120°. Purification of the solid proved to be rather difficult, but after several recrystallizations it was found that pure material could be obtained by placing the solid on top of a 1½″ column of alumina (80 mesh) and extracting with hexane. Colored impurities remained on top of the column and dimethyl $\alpha,\alpha,\alpha',\alpha',\gamma,\gamma,\gamma',\gamma'$-octamethyl-$\beta,\beta$-dioxo-p-benzenedivalerate collected in the pot; yield, 30.83 g. (35%), M.P. 135.5–138°.

*Analysis.*—Calcd. for $C_{26}H_{38}O_6$: C, 69.93; H, 8.58; mol. wt., 446.5; sapon. equiv., 223.3. Found: C, 69.79; H, 8.63; mol. wt., 448; sapon. equiv., 220.0.

Examples 5 and 6 demonstrate a distinguishing feature of the enolates formed in our process from a tetraalkyl-1,3-cyclobutanedione, under the special condition that labile hydrogen atoms are excluded. The examples also demonstrate an important advantage of our process in that it produces enolates of this type. Thus, in Examples 5 and 6 reaction of the enolate with an aralkyl halide results in aralkylation of the enolate at the 4-position. The enolates of 2,2,4,4-tetraalkylacetoacetic esters as formed in our process also undergo the various other reactions such as acylation, coupling, etc., at the 4-position. This distinguishes the enolates formed in our process from the enolates obtainable from diketene, which are enolates of unsubstituted acetoacetic esters. With the latter type of enolates, alkylation, arylation, etc., occur at the 2-position.

Another advantage in our procedure of making enolates from tetraalkylcyclobutane-1,3-diones over manufacture of enolates from diketene is that the tetraalkylcyclobutane-1,3-diones, although sufficiently active for synthetic work, are much more stable than diketene and are less dangerous to handle and less susceptible to deterioration in storage.

The invention has been described in considerable detail with particular reference to certain preferred embodiments thereof, but it will be understood that variations and modifications can be effected within the spirit and scope of the invention as described hereinabove, and as defined in the appended claims.

We claim:

1. The process for preparing a metal enolate of a 2,2,4,4-tetraalkylacetoacetic ester which comprises forming a reaction mixture free of substances having a labile hydrogen atom, and comprising a 2,2,4,4-tetraalkyl-1,3-cyclobutanedione of the formula:

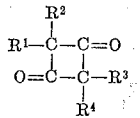

and an alkali-metal alkoxide of an alkanol of 1 to 12 carbon atoms; said reaction mixture containing at least one mole of said alkoxide per mole of said dione, and maintaining the reaction mixture at a reaction temperature of 0° C. to 150° C.; wherein each of $R^1$, $R^2$, $R^3$, and $R^4$, individually, is an alkyl group of 1 to 4 carbon atoms and wherein the groups $R^1$ and $R^2$ and the groups $R^3$ and $R^4$, taken together with the carbon atom to which they are attached, form a saturated carbocyclic ring of 5 to 6 members.

2. The process for preparing an alkali-metal enolate of a 2,2,4,4-tetramethylacetoacetic ester which comprises forming a reaction mixture free of substances having a labile hydrogen atom and comprising 2,2,4,4-tetramethyl-1,3-cyclobutanedione and an alkali-metal alkoxide of an alkanol of 1 to 12 carbon atoms in a ratio of at least one mole of said alkoxide per mole of said dione, and maintaining the reaction mixture at a temperature of 30° to 90° C.

3. The process for preparing the sodium enolate of methyl 2,2,4-trimethyl-3-oxovalerate which comprises forming a reaction mixture of 2,2,4,4-tetramethyl-1,3-cyclobutanedione, at least one mole of sodium methoxide per mole of said dione and an inert solvent, and free of substances having a labile hydrogen atom, heating the reaction mixture and maintaining the temperature thereof in the range of 30° to 90° C., and recovering said enolate from the reaction mixture.

4. The process for preparing the sodium enolate of methyl 2,4-dimethyl-2-ethyl-3-oxohexanoate which comprises forming a reaction mixture of 2,4-diethyl-2,4-dimethyl-1,3-cyclobutanedione, at least one mole of sodium methoxide per mole of said dione and an inert solvent, and free of substance having a labile hydrogen atom, heating the reaction mixture and maintaining the temperature thereof in the range of 30° to 90° C., and recovering said enolate from the reaction mixture.

5. The process for preparing the sodium enolate of ethyl 2,4-dimethyl-2-propyl-3-oxoheptanoate which comprises forming a reaction mixture of 2,4-dipropyl-2,4-dimethyl-1,3-cyclobutanedione, at least one mole of sodium ethoxide per mole of said dione and an inert solvent, and free of substances having a labile hydrogen atom, heating the reaction mixture and maintaining the temperature thereof in the range of 30° to 90° C., and recovering said enolate from the reaction mixture.

References Cited in the file of this patent

UNITED STATES PATENTS 3,089,896    Clark _____ May 14, 1963

FOREIGN PATENTS 950,338    France _____ Sept. 23, 1949

OTHER REFERENCES

Schroeter: Ber. Deut. Chem. 49, 2697–2699 (1916).